United States Patent [19]
Pives

[11] 3,716,573
[45] Feb. 13, 1973

[54] PREPARATION OF AMINO ACID DERIVATIVES

[75] Inventor: Seemon H. Pives, Murray Hill, N.J.

[73] Assignee: Merck & Co., Inc., Rahway, N.J.

[22] Filed: June 5, 1970

[21] Appl. No.: 57,395

Related U.S. Application Data

[62] Division of Ser. No. 774,213, Nov. 7, 1968, Pat. No. 3,676,453.

[52] U.S. Cl. ........260/471 A, 260/455 R, 260/559 D
[51] Int. Cl.............................................C07c 103/30
[58] Field of Search............................260/455 R, 471 A, 558 S, 558 A, 559 D

[56] References Cited

OTHER PUBLICATIONS

Finar, I. L., Organic Chemistry, Vol. I, Pub. By R. Clay and Co., Inc. Great Britain, page 677 cited.

*Primary Examiner*—Lorraine A. Weinberger
*Assistant Examiner*—L. Arnold Thaxton
*Attorney*—I. Louis Wolk, Harry E. Westlake, Jr. and Francis H. Deef

[57] ABSTRACT

Amino acid derivatives are prepared by reacting a 2,4 or 4 substituted-4H-oxazol-5-one with a carboxylic acid halide to form a novel oxazole product which rearranges on heating to the azlactone which is also novel. The rearranged product is reacted with ammonia, an alcohol, a mercaptan or amines to form the corresponding amino acid derivatives which are useful as pharmaceutical intermediates.

8 Claims, No Drawings

PREPARATION OF AMINO ACID DERIVATIVES

"This application is a division of U.S. Ser. No. 774,213 filed Nov. 7, 1968 now Pat. No. 3,676,453."

It is known in the art that various amino acid derivatives, such as the various derivatives of alanine and serine, are useful in the pharmaceutical fields. See. U.S. Pat. Nos. 2,868,818, No. 3,344,023, No. 3,275,648 and Journal of Organic Chemistry, volume 33, pages 1758-1761 (1968). In general, the synthesis of such compounds is relatively complex and requires a number of different reaction steps. It is an object of the present invention to provide a different reaction procedure for forming such amino acid derivatives. A further object is to provide a novel and useful class of compounds which are useful pharmaceutical intermediates. Other objects will become apparent as the description of the invention proceeds.

These objects are accomplished by the present invention which provides a process for preparing a compound of the formula

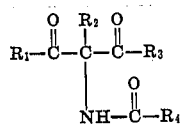

wherein
  $R_1$ is an aromatic radical containing from six to about 25 carbon atoms;
  $R_2$ is a lower alkyl group from one to about five carbon atoms;
  $R_3$ is selected from the group consisting of —OR, —SR, —NH$_2$, —NHR and —N—R wherein each of the R's are organic radicals containing from one to about 10 carbon atoms;
  $R_4$ is selected from the group consisting of H, an aromatic radical bonded through a nuclear carbon atom and a halogenated methyl group;

Which comprises (A) reacting, in an inert solvent, an aromatic carboxylic acid halide containing from seven to about 26 carbon atoms with a compound of the formula

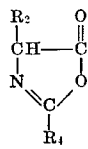

to form

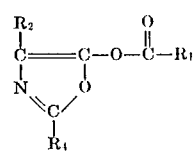

(B) heating the product which rearranges to form

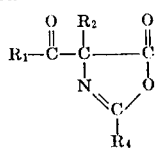

and then (C) reacting the rearranged product with a compound selected from the group consisting of ROH, RSH, NH$_3$, RNH$_2$ and

wherein the R's are defined above.

The present invention also provides a process for preparing compounds of the formula

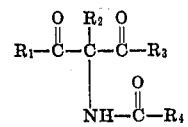

wherein
  $R_1$ is an aromatic radical containing from six to about 25 carbon atoms;
  $R_2$ is a lower alkyl group of from one to about five carbon atoms;
  $R_3$ is selected from the group consisting of —OR, —SR, —NH$_2$, —NHR and

wherein each of the R's are organic radicals containing from one to about 10 carbon atoms;
  $R_4$ is selected from the group consisting of H, an aromatic radical bonded through a nuclear carbon atom and a halogenated methyl group;

which comprises reacting a compound of the formula

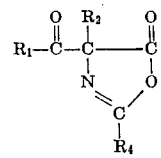

with a compound selected from the group consisting of ROH, RSH, NH$_3$, R—NH$_2$ and R—NH, wherein the R's are defined above.

The present invention further provides a compound selected from the group consisting of

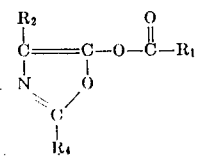

and

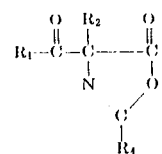

wherein
  $R_1$ is an aromatic containing from six to about 25 carbon atoms;

$R_2$ is a lower alkyl group of from one to about five carbon atoms; and $R_4$ is selected from the group consisting of H, an aromatic radical bonded through a nuclear carbon atom and a halogenated methyl group.

The "radicals" referred to above are defined in terms of the number of carbon atoms but it is to be understood that such radicals may contain functional groups such as amino groups, carboxyl groups, hydroxyl groups and the like. The expression "aromatic radical bonded through a nuclear carbon atom" means that the radical is attached by a bond from a carbon atom in the ring. The terminology "halogenated methyl group" means a radical of the formula

wherein each of the X's are halogen or hydrogen. Any "inert solvent" may be used for the reactions providing they at least partially dissolve the reactants and do not react with the reactants.

The reaction sequence is given below:

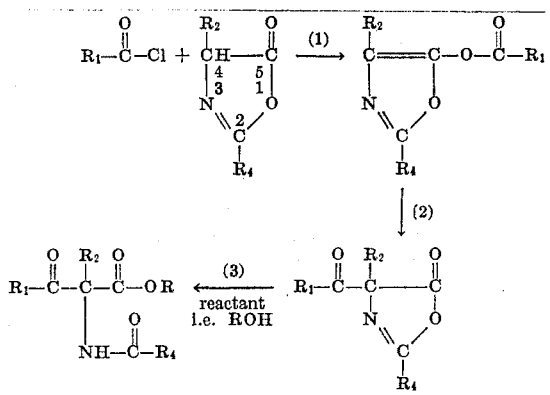

In carrying out reaction (1) above, various aromatic carboxylic acid halides may be used. Among them are included benzyl chloride, dibenzyloxybenzoyl chloride, p-chlorobenzoyl chloride, p-methoxybenzoyl chloride, 3,4-dimethoxybenzoyl chloride and the like. Halides other than the chlorides may also be used. The reaction is preferably carried out in the presence of a base. While an organic base such as triethylamine, pyridine, α-picoline or the like is generally preferred, inorganic bases may also be employed. The reaction is carried out in the presence of an inert solvent such as tetrahydrofuran, chloroform, dioxane, or any other solvent which at least partially dissolves the reactants without taking part in the reaction. The reaction proceeds at low temperatures and a temperature of from −10° C. to about room temperature is generally employed. However, the reaction may be carried out at a lower temperature for a longer period of time or it may be carried out at a high temperature under pressure if the solvent or reactants are volatile. The temperature therefore is not critical and may be selected as desired.

The arrangement reaction (2) give above is merely carried out by heating the reactants in an inert solvent. Preferably the solvent is basic, i.e., triethylamine and more preferably in a pyridine compound such as pyridine itself, α-picoline, 5-ethyl-2-methyl pyridine, 2,6-lutidine, β-picoline and the like. Again the reaction has a time temperature relationship and temperatures approximating room temperature require an extended period of time for the rearrangement. To hasten the reaction it is preferred that the mixture be heated from about 40 to about 100° C. so that the rearrangement occurs within a few hours.

In carrying out reaction (3) above, the azlactone is highly reactive and only mild conditions (i.e., room temperature or slight heating) are required to form the esters, amides and thio compounds. Again a solvent is employed as the reaction medium but it is to be noted that the alcohol or other reactant itself may serve as solvent in the system.

In carrying out each of the above reactions, it is preferred that $R_4$ is phenyl, $R_2$ is methyl, $R_3$ is —OR and $R_1$ is a substituted phenyl such as 3,4—dibenzyloxyphenyl.

The following examples are given to illustrate the invention and are not intended to limit it in any manner. All parts are given in parts by weight unless otherwise expressed.

EXAMPLE 1

A. Preparation of 5-(3,4-dibenzyloxybenzoyloxy)-4-methyl-2-phenyloxazole

3 Grams (17.1 millimoles) of N-benzoylalanine azlactone is dissolved in 10 ml. of tetrahydrofuran. To the solution is added 1.75 g. (17.3 millimoles) of triethylamine followed by a solution of 6.2 g. (17.5 millimoles) of 3,4-dibenzyloxybenzoyl chloride in 25 ml. of tetrahydrofuran over a 15-minute period while the temperature is maintained at 0°–10° C. After stirring for one hour, the solids are removed by filtration and the filtrate is evaporated to leave a residue of 5-(3,4-dibenzyloxybenzoyloxy)-4-methyl-2-phenyloxazole. The product is recrystallized from 20 ml. ethyl alcohol to give a 65% yield of product having a melting point of 101°–103° C. It can also be recrystallized from ether and ethyl acetate. The product is identified by N.M.R., I.R. and elemental analysis.

B. Preparation of 4-(3,4-dibenzyloxybenzoyl)-4-methyl-2-phenyloxazole-5-one

To 1 gram of the oxazole of Example 1A, above is added 5 ml. of pyridine. The mixture is heated on a steam bath for 3 hours and then the solvent is removed in vacuo to give 1 gram of 4-(3,4-dibenzyloxybenzoyl)-4-methyl-2phenyloxazole-5-one. The product is identified by N.M.R. and I.R.

C. Preparation of benzyl N-benzoyl-2-(3,4-dibenzyloxybenzoyl)-alaninate

The product of Example 1B, is dissolved in 5 ml. of benzyl alcohol which is allowed to stand overnight. The benzyl alcohol is removed by vacuum distillation and the product is chromatographed (with chloroform) on silica gel to give benzyl N-benzoyl-2-(3,4-dibenzyloxybenzoyl)- alaninate which is a solid melting at about room temperature. The product is identified by N.M.R., I.R. and conversion to known products.

The product can be reduced and each isomer, after separation, converted to the corresponding known serine derivative according to the procedure given in "Journal of Organic Chemistry," Volume 33, page 1758 (1968).

EXAMPLE 2

A. Preparation of 5-benzoyloxy-4-methyl-2-phenyloxazole

A mixture of 7.72 g. (40 millimoles) of N-benzoylalanine in 40 ml. of dioxane is warmed to near solution and then cooled to room temperature. To the mixture is added a solution of 8.26 g. (40 millimoles) dicyclohexylcarbodiimide in 10 ml of dioxane. After one hour at room temperature, 4.04 g. (40 millimoles) of triethylamine is added followed by the dropwise addition of 5.62 g. (40 millimoles) of benzoyl chloride. The mixture is stirred for one hour and then filtered. The filtrate is evaporated and the residue recrystallized from ethyl alcohol to give 5-benzoyloxy-4-methyl-2-phenyloxazole having a melting point of 115°–118° C. The product is identified by N.M.R., I.R. and elemental analysis.

B. Preparation of 4-benzoyl-4-methyl-2-phenyloxazol-5-one

To 1 g. of the oxazole of Example 2A, above is added 5 ml. of α-picoline. The mixture is heated on a steam bath for 3 hours and then the solvent is removed in vacuo to give 1 g. of 4-benzoyl-4-methyl-2-phenyloxazol-5-one. The product is identified by N.M.R. and I.R.

C. Preparation of methyl N-benzoyl-2-benzoylalaninate

The product of Example 2B, is dissolved in 5 ml. of methyl alcohol which is allowed to stand overnight. The methyl alcohol is removed by vacuum distillation nd the product is chromatographed (with chloroform) on silica gel to give methyl N-benzoyl-2-benzoylalaninate. The product is identified by N.M.R. and I.R.

EXAMPLE 3

A. Preparation of 5-p-chlorobenzoyloxy-4-methyl-2-phenyloxazole

The procedure of Example 2A, is repeated with the substitution of 7 g. (40 millimoles) of p-chlorobenzoyl chloride for the benzoyl chloride. The product is 5-p-chlorobenzoyloxy-4methyl-2-phenyloxazole having a melting point of 127°–129° C.

B. Preparation of 4-p-chlorobenzoyl-4-methyl-2-phenyloxazol-5-one

The procedure of Example 1B, is repeated employing the oxazole of Example 3A, above. The resulting product is 4-p-chlorobenzoyl-4-methyl-2-phenyloxazole-5-one which is identified by N.M.R. and I.R.

C. Preparation of methyl N-benzoyl-2-p-chlorobenzoyl alaninate

A slurry of 1 g. of 4-p-chlorobenzoyl-4-methyl-2-phenyloxazol-5-one in 10 ml. of methanol is stirred for 16 hours at room temperature. The excess methanol is removed by vacuum distillation to give a residue of methyl N-benzoyl-2-p-chlorobenzoyl alaninate. The product is identified by N.M.R. and I.R.

EXAMPLE 4

A. Preparation of 5-(m-methoxybenzoyloxy)-4-methyl-2-phenyloxazole

The procedure of Example 1A, is repeated with the following changes. Instead of the addition of dibenzyloxybenzoyl chloride there is added the acid chloride formed as follows: A solution of 2.6 g. (17 millimoles) of m-methoxybenzoic acid in 5 cc. of thionyl chloride is refluxed for 4 hours. The solvent is removed in vacuo and the residue dissolved in 25 ml. of tetrahydrofuran. The solution is then used in the procedure of Example 1A. The resulting product is 5-(m-methoxybenzoyloxy)-4-methyl-2-phenyloxazole. The product is identified by N.M.R. and I.R.

B. Preparation of 4-m-methoxybenzoyl-4-methyl-2-phenyloxazole-5-one

The procedure of Example 1B, is repeated employing the oxazole of Example 4A. The resulting product is 4-m-methoxybenzoyl-4-methyl-2-phenyloxazole-5-one which is identified by N.M.R. and I.R.

C. Preparation of benzyl N-benzoyl-2-m-methoxybenzoyl alaninate

The procedure of Example 1C. is repeated employing the compound of Example 4B. The resulting product is benzyl N-benzoyl-2-m-methoxybenzoyl alaninate which is identified by N.M.R. and I.R.

EXAMPLE 5

A. Preparation of 5-benzyloxy-4-iso-butyloxazole 6.36 Grams (40 millimoles) of N-formylleucine in 20 ml. of 1,2-dimethoxyethane is reacted with 8.26 g. (40 millimoles) of dicyclohexylcarbodiimide. The solids are filtered after 2 hours and 4.04 g. (40 millimoles) of N-methyl morpholine is added followed by the dropwise addition of 5.62 g. (40 millimoles) of benzoyl chloride. The resulting product is isolated according to Example 2A, and is 5-benzoyloxy-4-isobutyloxazole.

B. Preparation of 4-benzoyl-4-isobutyloxazol-5-one

The procedure of Example 2B, is employed utilizing the product of Example 5A. to give 4-benzoyl-4-isobutyloxazol-5-one. The product is identified by N.M.R. and I.R.

C. preparation of the ester

The procedure of Example 1C. is repeated employing the compound of Example 5B. to form the corresponding ester.

EXAMPLE 6

A. Preparation of 5-(3,4-dibenzyloxybenzoyloxy)-4-methyl-2-trifluoromethyloxazole The procedure of Example 1A. is repeated employing 2.86 g. of N-trifluoroacetylalanine azlactone instead of N-benzoylalanine azlactone. The product is 5-(3,4-dibenzyloxybenzoyloxy)-4-methyl-2-trifluoromethyloxazole.

B. Preparation of 4-(3,4-dibenzyloxybenzoyl)-4-methyl-2-trifluoromethyloxazol-5-one The procedure of Example 1B, is repeated employing the product of Example 6A. The resulting product is 4-(3,4-dibenzyloxybenzoyl)-4-methyl-2-trifluoromethyloxazol-5-one which is identified by N.M.R. and I.R.

C. Preparation of the ester

The procedure of Example 1C, is repeated employing the product of Example 6B, to obtain the corresponding ester.

EXAMPLE 7

A. Preparation of 5-benzoyloxy-4-methyl-2-p-nitrophenyloxazole

The procedure of Example 2A, is repeated employing 9.5 g. (40 millimoles) of N-p-nitrobenzoylalanine instead of N-benzoylalanine. The resulting product is 5-benzoyloxy-4-methyl-2-p-nitrophenyloxazole which is identified by N.M.R. and I.R.

B. Preparation of 4-benzoyl-4-methyl-2-p-nitrophenyloxazol-5-one

The procedure of Example 1B. is repeated employing the product of Example 7A. The resulting product is 4-benzoyl-4-methyl-2-p-nitrophenyloxazol-5-one which is identified by N.M.R. and I.R.

C. Preparation of the ester

The procedure of Example 1C, is carried out employing the product of Example 7B to obtain the corresponding ester which is identified by N.M.R. and I.R.

EXAMPLE 8

A. Preparation of the N-methylamide of N-benzoyl-2-benzoylalanine

4-Benzoyl-4-methyl-2-phenyloxazol-5-one is prepared according to the procedure of Example 2B given above. A solution of 4-benzoyl-4-methyl-2-phenyloxazol-5-one in tetrahydrofuran is treated with a 2 molar excess of methylamine in the same solvent. When the ir of the solution shows the absence of the absorption at ca. 1,825 cm.$^{-1}$, the volatiles are removed leaving the N-methylamide of N-benzoyl-2-benzoylalanine.

EXAMPLE 9

A. Preparation of butyl 2-benzamido-2-benzoylthiopropionate

4-Benzoyl-4-methyl-2-phenyloxazol-5-one is prepared according to the procedure of Example 2B, given above, 1 Gram of 4-benzoyl-4-methyl-2-phenyloxazol-5-one is dissolved in 10 ml. of dioxane. A 0.5 molar excess of butyl mercaptan is added to the solution and the mixture is allowed to stand overnight. The volatiles are removed leaving butyl 2-benzamido-2-benzoylthiopropionate.

EXAMPLE 10

A. Preparation of N-dibenzylamide of n-benzoyl-2-benzoylalanine

The procedure of Example 8A, is repeated employing dibenzylamine rather than methylamine. The resulting product is the corresponding N-dibenzylamide of n-benzoyl-2-benzoylalanine.

EXAMPLE 11

A. Preparation of the amide of N-benzoyl-2-benzoylalanine

The procedure of Example 8A. is repeated employing ammonia rather than methylamine. The resulting product is the amide of N-benzoyl-2-benzoylalanine.

While in the above examples, a limited number of reactants, solvents, temperatures and the like are given, it is obvious that other reactants, solvents and temperatures can be employed with equally successful results.

Many other equivalent modifications would be apparent to those skilled in the art from a reading of the foregoing without a departure from the inventive concept.

What is claimed is:

1. A process for preparing a compound of the formula $$R_1-\overset{O}{\underset{}{C}}-\overset{R_2}{\underset{NH-\overset{O}{\underset{}{C}}-R_4}{C}}-\overset{O}{\underset{}{C}}-R_3$$

wherein
   $R_1$ is dibenzyloxyphenyl;
   $R_2$ is a lower alkyl group;
   $R_3$ is selected from the group consisting of —OR, —SR, —NH$_2$, NHR and $$-\overset{R}{\underset{}{N}}-R$$

wherein each of the R's are hydrocarbon radicals containing from one to seven carbon atoms;
   $R_4$ is selected from the group consisting of phenyl and trifluoromethyl;
   which comprises (A) reacting, in an inert solvent, dibenzyloxybenzoyl halide with a compound of the formula $$\begin{array}{c} R_2 \\ CH-C \\ N \quad O \\ \diagdown C \diagup \\ R_4 \end{array}$$

to form $$\begin{array}{c} R_2 \quad O \\ C=C-O-C-R_1 \\ N \quad O \\ \diagdown C \diagup \\ R_4 \end{array}$$

(B) heating the product to a temperature of from 40°C. to 100°C. which rearranges to form $$R_1-\overset{O}{\underset{}{C}}-\overset{R_2}{\underset{}{C}}-\overset{O}{\underset{}{C}} \begin{array}{c} \\ O \\ N \\ \diagdown C \diagup \\ R_4 \end{array}$$

and then (C) reacting the rearranged product with a compound selected from the group consisting of ROH, RSN, NH$_3$, RNH$_2$ and $$R-NH$$
$$|$$
$$R$$

wherein the R's are defined above.

2. A process for preparing compounds of the formula $$R_1-\overset{O}{\underset{}{C}}-\overset{R_2}{\underset{NH-\overset{O}{\underset{}{C}}-R_4}{C}}-\overset{O}{\underset{}{C}}-R_3$$

wherein
   $R_1$ is dibenzyloxyphenyl;
   $R_2$ is a lower alkyl group;
   $R_3$ is selected from the group consisting of —OR, —SR, —NH$_2$, —NHR and $$-\overset{R}{\underset{}{N}}-R$$

wherein each of the R's are hydrocarbon radicals containing from one to seven carbon atoms;

$R_4$ is selected from the group consisting of phenyl and trifluoromethyl;

which comprises reacting a compound of the formula

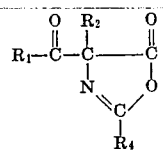

with a compound selected from the group consisting of ROH, RSH, $NH_3$, $R-NH_2$ and $$\begin{array}{c} R \\ | \\ R-NH \end{array}$$

wherein the R's are defined above.

3. The process of claim 1 wherein $R_4$ is phenyl.
4. The process of claim 1 wherein $R_2$ is methyl.
5. The process of claim 1 wherein $R_3$ is —OR.
6. The process of claim 2 wherein $R_4$ is phenyl.
7. The process of claim 2 wherein $R_2$ is methyl.
8. The process of claim 2 wherein $R_3$ is —OR.

* * * * *